United States Patent Office 2,765,877
Patented Oct. 9, 1956

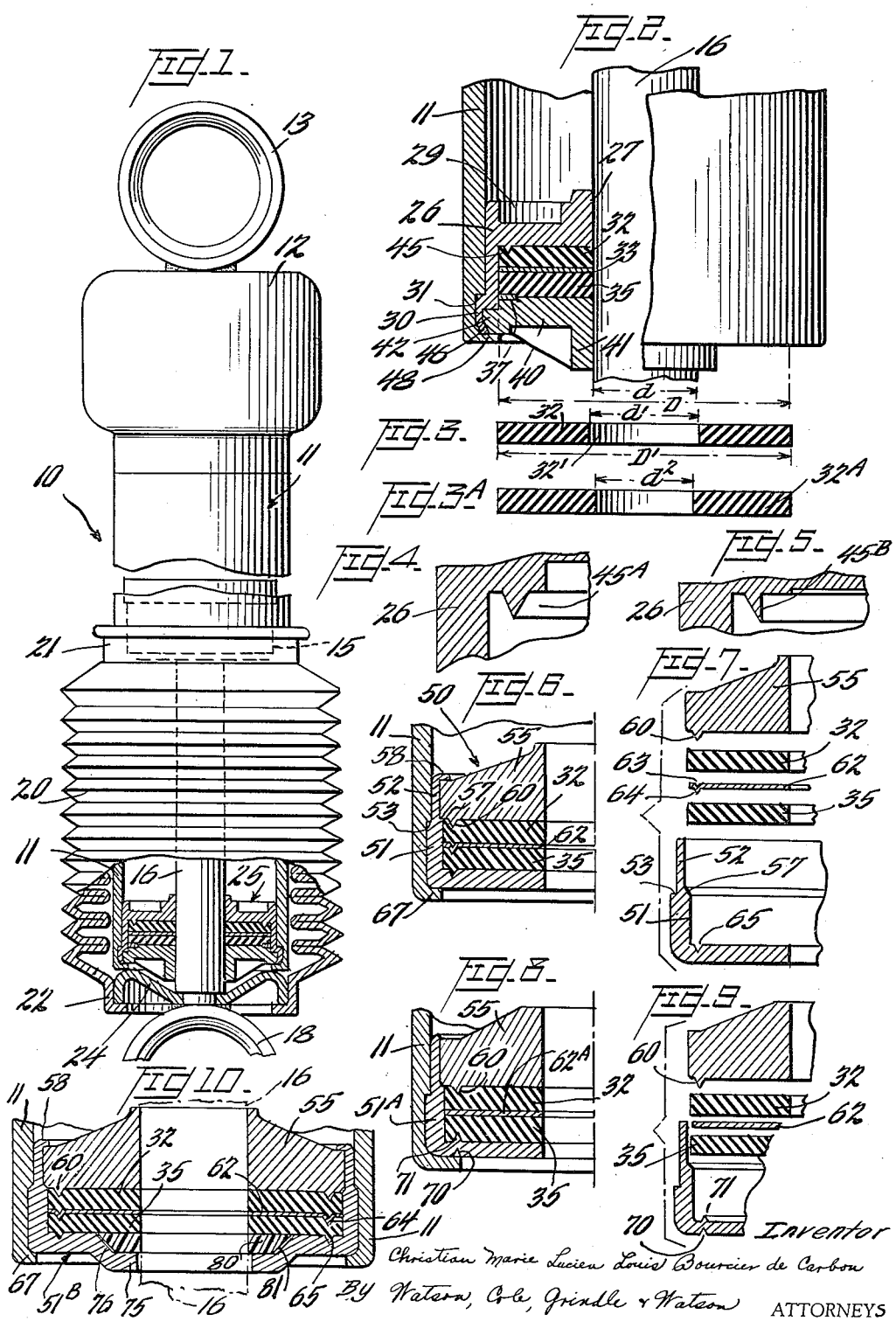

2,765,877

ROD SEAL FOR SHOCK ABSORBERS

Christian M. L. L. Bourcier de Carbon,
Neuilly-sur-Seine, France

Application February 8, 1952, Serial No. 270,587

4 Claims. (Cl. 188—100)

This invention relates to packing or fluid sealing means for rotary or reciprocating rods or shafts, and more specifically to packing arrangements particularly suitable for application to the aero or reciprocating type of vehicle shock absorbers in order to prevent leakage of working fluid from the cylinder around the periphery of the piston rod.

The present invention relates to the same generic class of rod packing as those illustrated and described in my copending United States applications Serial No. 102,784, filed July 2, 1949 (now abandoned) and Serial No. 145,788, filed February 23, 1950 (now Patent Number 2,719,612, issued October 4, 1955), but provides certain improvements over the prior constructions in respect to a number of novel and ingenious details which make for greater efficiency and economy in assembly and operation. This application is a continuation-in-part of the above mentioned application Serial No. 102,784 which derives from my corresponding French application 572,318, filed May 14, 1949.

In its preferred embodiments, the invention contemplates the provision of a novel and improved pre-assembled packing cartridge which comprises a cup-like receptacle containing alternating rigid and resilient rings or discs, the resilient deformable discs being prestressed in certain ways to seize the rod more firmly, and the whole arrangement snugly confined by a closure cap seated within the mouth of the receptacle. The assembled packing cartridge may be placed about the piston rod and then forced into the cylinder, or contrariwise the cartridge may first be positioned in the cylinder end and then the rod forced through the central opening in the cartridge. Finally the rim of the cylinder wall is spun or swaged over the edge of the packing cartridge and thus fixedly secured with relation to the cylinder of the shock absorber.

Although the novel packing cartridge may be employed in shock absorbers and other hydraulic devices of various kinds, it is peculiarly adapted for use in sealing the piston rod openings in the ends of the working cylinders of shock absorbers in which the cylinder is secured to the body or chassis of the vehicle and the piston rod to the wheel mountings, such a connection being a most difficult one to seal with ordinary or conventional packing devices.

Other objects and features of novelty will be apparent from the following detailed description when read in connection with the accompanying drawings in which certain embodiments of the invention are illustrated by way of example.

In the drawings:

Figure 1 is a view in elevation of a shock absorber embodying the principles of the invention, certain pertinent parts, including the packing cartridge, being shown in section;

Figure 2 is a fragmentary enlarged view of the lower end of the shock absorber with its packing cartridge, one side being shown in vertical section;

Figure 3 is a diametric section through one of the rubber-like packing annuli employed in the cartridge assembly, according to one dimensional concept of the invention;

Figure 3A is a similar view of a packing annulus having a different internal diameter ratio with respect to the piston rod;

Figure 4 is a greatly enlarged fragmentary vertical sectional view of the marginal seating area for the resilient annulus within the cartridge cup;

Figure 5 is a similar view of another annulus seating arrangement;

Figure 6 is a fragmentary sectional view of another embodiment of the invention appropriate for the use of a steel cartridge shell;

Figure 7 is an exploded or dis-assembled sectional view of the cartridge shown in Figure 6;

Figure 8 is a view similar to Figure 6 showing a further modified form of rod packing cartridge;

Figure 9 is an exploded sectional view of the packing shown in Figure 8; and

Figure 10 is a view similar to Figures 6 and 8 except it is carried all the way through the structure and shows a still further modified form of packing cartridge.

In Figure 1 of the drawings there is shown somewhat diagrammatically a shock absorber of the same general type as that covered in my above mentioned copending application Ser. No. 145,788. The shock absorber, designated generally by the reference numeral 10, is of an inverted type wherein the cylinder 11 is provided at the top of its dome-like head 12 with a loop or ring 13 by which it may be secured to the body or chassis of the vehicle. A piston 15 reciprocates within the working chamber of the cylinder 11 and is provided with a piston rod 16 which extends through the lower end of the cylinder and is adapted to be secured to the wheel mounting of the vehicle by means of the loop or eye 18. Obviously upon compression of the vehicle springs the piston will move upwardly in the cylinder and through certain valving and other fluid restricting means, which do not form any part of the present invention, the movement is cushioned in order to prevent shocks and improve the riding qualities of the vehicle. Similarly, upon rebound the vehicle springs expand and the piston 15 moves downwardly within the cylinder 11 and appropriate fluid restriction means of various resistances serve to cushion the rebound stroke.

In a fashion similar to the shock absorbers described in my earlier applications, the piston rod, during its projection from the cylinder, is protected from dirt, dust, grit, and the like by means of the bellows sleeve or boot 20 which has a narrowed neck portion 21 fitted around the body of the cylinder 11 and a similar flanged lower neck portion 22 which is snapped over the flanged annular plate or disc 24 which is rigidly carried by the piston rod 16 between a shoulder on the rod and the securing ring or eye 18.

This inversion of the shock absorber, as compared with common practices in the use of the aero reciprocating type of device, necessitates an exceptionally secure packing of the piston rod where it enters the lower end of the cylinder 11.

Ingenious arrangements of packing which have proved very effective are described in my above mentioned copending applications, but the present invention affords additional novel and improved means for providing the piston packing feature which effect economies and savings of time in manufacturing and assembling the shock absorber, as well as affording a compact and highly efficient sealing means. According to the present invention the packing elements are pre-assembled in the form of a cartridge which is designated by the general reference character 25. The construction and arrangement of the cartridge may best be observed in the enlarged view of Figure 2. The cartridge will be seen to comprise the cup-like shell or receptacle 26, the base of which is provided with a perforation 27, the walls of which fit the surface of the piston rod 16 rather snugly. The shell is preferably made of the alloy Zamak which consists of somewhat over 92% zinc with small percentages of aluminum, copper, and steel and minute quantities of lead, cadmium, tin, magnesium and iron. The following table shows suggested, but not limiting, analyses of this alloy:

|  | A | B | C |
|---|---|---|---|
|  | Percent | Percent | Percent |
| Aluminum | 3.9-4.3 | 3.9-4.3 | 3.9-4.3. |
| Copper | 2.5-2.9 | 0.03 (max.) | 0.75-1.25. |
| Iron | 0.075 (max.) | 0.075 (max.) | 0.075 (max.). |
| Lead | 0.003 | 0.003 | 0.003. |
| Cadmium | 0.003 | 0.003 | 0.003. |
| Tin | 0.001 | 0.001 | 0.001. |
| Magnesium | 0.02-0.05 | 0.3-0.6 | 0.03-0.06. |
| Zinc | Balance | Balance | Balance. |

The shell is preferably die-cast and may be provided with radial recesses or hollows 29 in its base, in order to lighten the device while maintaining its strength and rigidity. The mouth of the shell or receptacle 26 is provided by an offset flange 30 which is received within the shouldered recess 31 at the end of the cylinder 11. The interior of the shell 26 receives first of all the annulus or disc 32 which is made of rubber or a rubber-like plastic or synthetic material having the general resilient and deformable properties of rubber. Next, there is interposed a metallic annular disc 33, and then a second rubber or rubber-like annulus 35 is placed within the shell of the cartridge. Upon the margins of this latter disc 35 there is disposed a flat washer 37, and then upon the entire assembly there is fitted the cover or closure element 40. The cover 40 is preferably made of the Zamak alloy and provided with a tubular boss or extension 41 which snugly surrounds the piston rod. The Zamak alloy is of course a softer material than the steel of which the piston rod is made. The margins of the cover element 40 are flanged as at 42 to be received within the offset shouldered mouth portion of the shell 26 provided by the flange 30. The margins of the inner surface of the closure element 40 are shouldered or indented very slightly to receive the washer 37, but this indentation is not as deep as the thickness of the washer itself.

The rubber discs or annuli 32 and 35 may be proportioned in accordance with the principles of the inventions described in my two above mentioned copending applications and in this case the discs will be dimensioned as indicated in Figure 3 of the drawings. If the reference character D represents the internal diameter of the cartridge shell 26 and the letter $d$ represents the diameter of the piston, then the relaxed undistorted free diameter $D'$ of the disc 32 will be seen to be slightly greater than the internal shell diameter D, and the internal diameter $d'$ of the disc slightly greater than or at least equal to the diameter $d$ of the piston rod. In this case when the discs 32 are forced into the cup or shell 26 the material of which the disc is made is distorted radially inward so that the internal diameter $d'$ lessens and the walls of the central orifice 32' of the disc grip the walls of the piston rod snugly when the assembly is finally completed.

There is preferably provided upon the bottom of the interior of the shell 26 and adjacent the margins thereof, an annular rib or tooth-like projection 45 which is indented into the margin of the first deformable disc 32 to ensure a firm grip upon the disc. Also, the washer 37 is embedded to a very slight extent in the periphery of the outer disc 35 and these two protuberances serve to effectively clinch the margins of the packing elements firmly when the cover or closure 40 is applied.

In any case, according to the invention, the volume of the internal pocket or chamber of the cartridge, bounded by the shell 26, the cover or closure 40, and the piston rod itself, is always equal to or slightly greater than the volume of the two resilient discs 32 and 35, plus that of the metal washer 33. This is in order to ensure the slight flexing effect of the resilient washers.

The packing assembly 25 is completed by coining the extreme edge 46 of the flange 30 of the shell 26 over the margins of the cover or closure 40. In the preferred method of assembly, the assembled packing cartridge is forced upon the piston rod 16 and then at the appropriate stage in the assembly of the entire shock absorber, the cartridge is forced into the mouth of the lower end of the working cylinder 11 and finally the margin 48 of the flanged end of the cylinder is spun or cold coined over the lower outer periphery of the cartridge and the whole packing arrangement rigidly and firmly fixed with relation to the cylinder. The radial deformation and stressing of the annuli or discs 32 and 35 serve to effectively seal the end of the cylinder and prevent leakage of working fluid around the piston rod.

Two optionally usable forms of clenching rib are illustrated for purposes of example in Figures 4 and 5 of the drawings, the rib 45A in Figure 4 having a cross section in the form of an isosceles triangle, while the rib 45B in Figure 5 is in the form of a right triangle.

In certain embodiments of the invention, the principles of construction of the deformable discs 32 and 35 may be departed from and an example of this modification is shown in Figure 3A in the drawings where the annulus 32A, while provided with a diameter $D'$ which is greater than the internal shell diameter D, has an internal diameter $d^2$ which is actually smaller than the diameter $d$ of the piston rod. This arrangement, of course, requires an additional distortion and compression of the disc 32A when the rod 16 is forced through the packing cartridge, and this modified arrangement affords a longer wearing cartridge, resulting from a greater compensational feed-in of material of which the packing washer is made. Either of the above described arrangements, or any other modification of details of the deformable washer may be practiced within the broad scope of the present invention.

In the succeeding figures of drawing, there are described embodiments of the invention in which the shell of the cartridge is made of cold rolled steel. In Figures 6 and 7 the cartridge as a whole is designated by the reference numeral 50 and the shell 51 made of steel has an outwardly directed narrowed flange 52 shouldered to fit within a corresponding shoulder in the wall of the cylinder 11 as indicated at 53. The arrangement is the reverse of that shown in Figures 1 and 2 of the drawings, the shell 51 opening toward the interior of the casing and provided with the inwardly disposed cap or cover 55. The cover or closure element 55 is preferably made of compressed powdered metal, for example, oil-impregnated iron, and the margins of the closure element are seated upon an internal shoulder 57 formed in the shell. When the assembly is completed the extreme edge of the flange 52 is coined over the closure element as at 58.

In this particular embodiment, the cover or closure element 55 is provided adjacent the margins of its inner surface with an annular rib or tooth 60. The intervening metallic separating disc 62 is provided with an annular offset adjacent its marginal portion which provides an indentation 63 upon one side of the disc and a rib or protuberance 64 on the other side. Finally the interior surface of the bottom wall of the cartridge shell 51 is provided with an annular groove 65. The rubber-like deformable discs or annuli 32 and 35 are applied as in the examples previously described, being separated by the metal disc 62.

It will be seen that the annular rib or protuberance 60 cooperates with the groove 63 in the plate 62 to firmly grip the margins of the first deformable annulus 32 and the rib or tooth 64 on the disc 62 similarly cooperates with the groove 65 in the bottom of the shell, to grip the margins of the other deformable annulus 35.

Upon forcing the packing assembly or cartridge home within the flanged end of the cylinder 11 the margins of the cylinder are spun over the edge of the shell 51 as at 67.

The embodiment shown in Figures 8 and 9 of the drawings differs from that illustrated in Figures 6 and 7 only in that the steel shell 51A is indented from the outside, during the stamping process by which it is made, as shown at 70, this indentation forming a projection or rib 71 on the inside of the shell. The downward projection 60 from the cover member 55 is disposed opposite the rib or projection 71 and the intervening metal disc 62A is plain as in the case of the disc 33 in Figure 2 of the drawings. In this instance the ribs 60 and 71 acting in opposite directions serve to clinch the packing discs in place.

A still further embodiment of the invention is illustrated in Figure 10 of the drawings and, since for the most part the embodiment resembles the one illustrated in Figures 6 and 7, the same reference numerals will be employed to indicate the common features. Therefore, the main cylinder of the shock absorber is indicated by the numeral 11 and the reciprocating piston rod by the numeral 16. The packing cartridge includes the inwardly disposed cap member 55 which is the counterpart of the similarly designated element in Figure 6. The shell element which is seized or gripped firmly within the end of the cylinder 11 is, however, of somewhat different construction than the shell of Figure 6 and is therefore designated 51B. The two resilient washers 32 and 35 are the same as those shown in Figures 6 and 7 and the intervening metal disc 62 is the same. These three elements perform the same cooperating functions and are anchored by means of similar corrugations, notches, and grooves such as indicated at 60, 64, and 65.

The feature which characterizes the embodiment shown in Figure 10 resides in the drawing outwardly of the central portion 75 of the base of the shell 51B thus providing an annular frusto-conical recess or pocket 76 between the central portion of the base plate of the shell and the lowermost resilient washer 35. In addition to this swelling of the base plate outwardly, the margins of the opening in the plate through which the piston rod 16 reciprocates are widened very slightly to substantially withdraw the steel base plate from sliding contact with the piston rod.

Within the recess or pocket 76 there is disposed an annular frusto-conical washer 80. This washer fits fairly snugly within the pocket or recess, and its internal diameter is substantially the same as the diameter of the piston rod 16 so that it is in sliding contact therewith. The washer may be made of hard synthetic rubber, plastic, fiber, or similar material and is arranged so that it can float laterally very slightly during operation to maintain proper alignment of the various parts of the packing cartridge. This is provided for by the exceedingly slight marginal clearance between the conical wall 81 of the washer and the corresponding wall of the confining steel base plate.

The reason for this modification is to increase the life of the shock absorber while at the same time improving the sealing of the joint. In the earlier designs, it was found that in some cases there was steel-to-steel contact between the piston rod and the margin of the cartridge base plate opening, and especially when the shock absorber was mounted at an angle greater than say 30°. This condition might arise either after the upper inner cap member 55 has been worn a little, or due to flexing of the piston rod. In order to retard the development of this condition, which produces a somewhat disagreeable metallic noise, the internal diameter of the base cartridge plate has been increased, and the insertion of the hard rubber or fiber disc or washer 80 serves not only to eliminate the steel-to-steel contact, with close tolerance of internal diameter of the washer, but also retains the sealing and wiping resilient discs, especially the one designated 35, in proper conforming condition and not subject to wear or any tendency for the disc to flow between the piston rod and the internal diameter of the cartridge opening.

It should be emphasized that in all of the embodiments shown, the radially compressible discs 32 and 35 while being closely confined in an axial direction, are not subjected to any considerable axial pressure. This is insured by the provision of the contacting shoulders 30 and 42 as in Figure 2 and the shoulder 57 as in Figures 6 and 7 against which the cover piece 55 abuts.

Under certain circumstances, it might be useful to employ a single rubber or rubber-like disc corresponding to either of the discs 32 or 35, and this provision is within the scope of the present invention.

It is understood that various other changes and modifications may be made in the embodiments of the invention illustrated and described herein without departing from the scope of the invention as defined in the following claims.

Having thus described the invention, what is claimed as new and desired to be secured by Letters Patent is:

1. A shock absorber comprising a cylindrical casing enclosing a working chamber and adapted to be secured to one of two relatively sprung members; a piston disposed within the chamber for reciprocation therein; working fluid in said chamber through which said piston moves; a piston rod extending through one end of said casing, having one of its ends secured to said piston, and having its other end secured to the other of said relatively sprung members; an annular packing cartridge disposed within said end of the casing and surrounding said piston rod; said cartridge comprising cylindrical side walls and axially spaced inner and outer end plates, said end plates having central openings therein through which the piston rod passes; one or more resilient deformable rubber-like annular packing discs compressed radially inwardly within said cartridge toward said piston rod, said discs being confined by the said end plates against any substantial axial movement or distortion; one of the end plates of the cartridge having the portion surrounding its central opening offset axially outwardly from its normal plane to form an internal pocket, a hard non-metallic annular disc disposed within said pocket and having an opening therein slidingly receiving said piston rod, the margins of the central opening of the offset plate being out of contact with said piston rod; the last named disc confining the central portion of the adjacent resilient packing disc and also fitting the pocket for slight lateral floating movement with the piston rod relative to the cartridge.

2. A packing cartridge particularly adapted for insertion in the end of the working cylinder of a shock absorber to snugly embrace the piston rod and prevent leakage of working fluid during the reciprocating movement of the piston within the cylinder; said cartridge comprising cylindrical side walls and axially spaced inner and outer end plates, said end plates having central openings therein to receive the piston rod; one or more resilient deformable rubber-like annular packing discs adapted to be compressed radially inwardly within said cartridge against the piston rod when applied thereto, said discs being confined by the end plates against axial movement and distortion; the outer end plate of the cartridge having its central portion adjacent the opening therein offset axially outwardly from its normal plane to form an internal pocket, the plate being distorted at the offset to provide sloping walls to make the pocket of a frusto-conical shape, the smaller end outward; a hard non-metallic annular disc of corresponding frusto-conical shape disposed within the pocket, its inner walls adapted to receive the piston with snug bearing contact, but with its frusto-conical edges spaced very slightly from the corresponding portions of the pocket to provide very slight lateral floating movement under certain conditions of use; the central opening in the offset end plate being of slightly larger diameter than the piston rod to prevent contact between the rod and the margins of the opening.

3. A packing cartridge for use in the cylinder of a shock absorber or the like to seal the piston rod, said cartridge comprising a steel cup-like shell having a circular end plate provided with a central opening through which the piston rod is adapted to pass and an annular wall flange enclosing a cylindrical interior space; a plurality of flat resilient rubber-like annular packing discs compressed radially within said space to frictionally receive the piston rod, a cover plate of somewhat softer metal than steel secured at its periphery to the flanges of said shell and provided with a central opening to receive said rod and adapted to confine said packing discs against movement and distortion in an axial direction, the circular end plate of the shell being cupped internally to provide a central pocket therein, the central portion of the plate being thus offset outwardly, a hard non-metallic annular disc disposed within said pocket and having its central opening adapted to snugly and slidingly receive said piston rod but free to float laterally slightly with respect to the remainder of the cartridge when necessary during operation, the central opening in the steel end plate being of a diameter larger than that of the piston rod to relieve any steel-to-steel bearing contact.

4. A unitary packing cartridge particularly adapted for pre-assembly and insertion in the end of the working cylinder of a shock absorber to snugly embrace the piston rod and prevent leakage of working fluid during the reciprocating movement of the piston within the cylinder; said cartridge comprising a cup-like shell having a circular end plate provided with a central opening through which the piston rod is adapted to pass and an annular wall flange enclosing a cylindrical interior space; at least two flat annular packing discs within said space, said discs being composed of a deformable rubber-like material and having a central opening therein to receive said rod, the external diameter of said discs in released unconfined condition being greater than that of the space in which the discs are disposed, and said discs having an internal diameter which under the same conditions approximate that of said rod sufficiently to be deformed, upon assembly, radially inwardly toward its center so that it may firmly embrace the rod when the cartridge is applied thereto; and a cover plate secured at its periphery to the flanges of said shell and provided with a central opening to receive said rod and adapted to confine said discs against distortion in an axial direction, the two adjacent deformable discs being separated by one metal disc, and the interior end wall of the shell and the inner surface of the cover plate being provided one with an annular rib and the other with a registering complementary groove, said rib and groove being spaced slightly inwardly from the peripheries of said wall and surface, and the intervening metal disc being formed with an annular offset presenting an annular rib to the groove in one of the first mentioned surfaces and an annular groove to the rib in the other of said surfaces, whereby the two deformable discs are clinched near their peripheries between the respective registering ribs and grooves of the shell, the metal disc, and the cover plate.

References Cited in the file of this patent

UNITED STATES PATENTS

| | | |
|---|---|---|
| 1,355,318 | Drew | Oct. 12, 1920 |
| 2,352,343 | Reynolds | June 27, 1944 |
| 2,385,941 | Reynolds | Oct. 2, 1945 |
| 2,399,550 | Klein | Apr. 30, 1946 |
| 2,481,088 | Cuskie | Sept. 6, 1949 |
| 2,502,977 | Meynig | Apr. 4, 1950 |
| 2,527,034 | Rossman | Oct. 24, 1950 |
| 2,608,422 | Allinquant | Aug. 26, 1952 |
| 2,647,774 | Newberry | Aug. 4, 1953 |

FOREIGN PATENTS

| | | |
|---|---|---|
| 427,362 | Great Britain | Apr. 23, 1935 |